United States Patent
Cetinkaya

(10) Patent No.: US 12,169,397 B2
(45) Date of Patent: Dec. 17, 2024

(54) METHOD, SYSTEM AND DEVICE FOR ACQUISITION AND PROCESSING OF ELASTIC WAVES AND FIELD SENSOR DATA FOR REAL-TIME IN-SITU MONITORING OF ADDITIVE MANUFACTURING

(71) Applicant: Cetin Cetinkaya, Potsdam, NY (US)

(72) Inventor: Cetin Cetinkaya, Potsdam, NY (US)

( * ) Notice: Subject to any disclaimer, the term of this patent is extended or adjusted under 35 U.S.C. 154(b) by 593 days.

(21) Appl. No.: 17/367,516

(22) Filed: Jul. 5, 2021

(65) Prior Publication Data

US 2023/0004142 A1  Jan. 5, 2023
US 2024/0255915 A9  Aug. 1, 2024

Related U.S. Application Data

(63) Continuation-in-part of application No. 15/731,366, filed on Jun. 1, 2017, now Pat. No. 11,092,943.

(51) Int. Cl.

| | |
|---|---|
| *G06N 5/02* | (2023.01) |
| *B22F 10/85* | (2021.01) |
| *B33Y 50/02* | (2015.01) |
| *G05B 19/4099* | (2006.01) |
| *G05B 19/418* | (2006.01) |
| *G06N 20/00* | (2019.01) |

(52) U.S. Cl.
CPC .......... *G05B 19/4099* (2013.01); *B22F 10/85* (2021.01); *B33Y 50/02* (2014.12); *G05B 19/41875* (2013.01); *G06N 5/02* (2013.01); *G06N 20/00* (2019.01); *G05B 2219/49023* (2013.01)

(58) Field of Classification Search
CPC .......... G05B 19/4099; G05B 19/41875; G05B 2219/49023; G05B 2219/32193; G05B 2219/32194; G05B 2219/49007; B22F 10/85; B22F 12/90; B33Y 50/02; B33Y 30/00; G06N 5/02; G06N 20/00; Y02P 10/25

See application file for complete search history.

(56) References Cited

U.S. PATENT DOCUMENTS

| | | | |
|---|---|---|---|
| 2007/0176312 A1* | 8/2007 | Clark | B29C 64/153 425/375 |
| 2017/0284971 A1* | 10/2017 | Hall | G01N 29/265 |
| 2018/0101167 A1* | 4/2018 | DehghanNiri | G01N 29/4427 |

* cited by examiner

*Primary Examiner* — Walter L Lindsay, Jr.
*Assistant Examiner* — Geoffrey T Evans

(57) ABSTRACT

A set of multi-mode elastic wave generating and detecting devices and field sensors are utilized in a real-time in-situ monitoring system based on the quality assessment of a specially designed article made by an additive manufacturing machine. The original invention disclosed in U.S. patent application Ser. No. 15/731,366 involves the transmission and reception of waves into a periodic test artifact while it is being built. The current invention involves the transmission and reception of multi-mode waves into a test artifact, the processing of data from narrow and wide field-of-view sensors, and correlating and relating the waveforms and sensor data while it is being built using physics-based and machine learning models. The disclosed system may initiate control and real-time corrective actions based on the properties and characteristics of the obtained waveforms and sensor data and their correlations and functional relationships.

14 Claims, 11 Drawing Sheets

METHOD, SYSTEM AND DEVICE FOR ACQUISITION AND PROCESSING OF ELASTIC WAVES AND FIELD SENSOR DATA FOR REAL-TIME IN-SITU MONITORING OF ADDITIVE MANUFACTURING

BACKGROUND

Field of the Disclosure

The embodiments generally relate to additive manufacturing machinery, and in particular to in-process real-time in-situ monitoring and quality assessments of additive manufacturing processes, machines, and source materials with elastic wave devices and field sensors.

Prior Art

The following is a tabulation of some prior art that presently appears relevant:

PATENT CITATIONS

| Cited Patent | Filing date | Publication date | Applicant | Title |
|---|---|---|---|---|
| 15/731,366 | Jun. 1, 2017 | N/A | Pharmacoustics Technologies, LLC | Method, system, and device for real-time in-situ additive manufacturing monitoring |
| U.S. Pat. No. 10,900,890B2 | 2019 Jun. 10 | 2021 Jan. 26 | MTU Aero Engines GmbH | Method and device for evaluating the quality of a component produced by means of an additive laser sintering and/or laser melting method |
| DE102016213609A1 | 2016 Jul. 25 | Application, N/A | EOS GmbH | Method and device for determining component quality |
| U.S. Pat. No. 9,724,876B2 | 2013 Dec. 13 | 2015 Jun. 18 | General Electric Company | Operational performance assessment of additive manufacturing |
| U.S. Pat. No. 10,073,060B2 | 2015 Nov. 19 | 2017 May 25 | General Electric Company | Non-contact acoustic inspection method for additive manufacturing processes |
| US20180297115A1 | 2017 Apr. 14 | 2018 Oct. 18 | General Electric Company | Real Time Detection of Defects during Formation of an Additively Manufactured Component |

Nonpatent Literature Documents

1. EVERTON, S. K., ET AL., "Review of in-situ process monitoring and in-situ metrology for metal additive manufacturing", Materials and Design, pp. 431-445, vol. 95, 2016.
2. GRASSO, M. AND COLOSIMO, B. M., "Process defects and in situ monitoring methods in metal powder bed fusion: a review", Measurement Science and Technology, vol. 28, no. 4, 2017.
3. MANI, MAHESH, ET AL., "Measurement science needs for real-time control of additive manufacturing powder bed fusion processes", NIST Interagency/Internal Report No. 8036, 2015.
4. WALLER, JESS M., ET AL., Nondestructive Evaluation of Additive Manufacturing State-of-the-Discipline Report, NASA/TM—2014-218560, 2014.
5. AMSC ROADMAP, America Makes & ANSI Additive Manufacturing Standardization Collaborative (AMSC), FINAL DRAFT dated Feb. 17, 2017, American National Standards Institute (ANSI)/National Center for Defense Manufacturing and Machining, 2017.
6. Standard Practice/Guide for Intentionally Seeding Replicates into Additively Manufactured (AM) Structures, ASTM, Work Item Number: 56649, Draft Document, 2017.
7. MOYLAN, S. P., ET AL., A review of test artifacts for additive manufacturing, NIST Interagency/Internal Report (NISTIR) 7858, May 24, 2012.
8. XU, X., VALLABH, C. K. P., VOLK, S., AND CETINKAYA, C., "In-Process Thread Orientation Monitoring in Additive Manufacturing", 3D Printing and Additive Manufacturing, 6(1), 21-30, 2019.
9. XU, X., CHAITANYA KRISHNA PRASAD VALLABH, ZACHARY JAMES CLELAND, AND CETIN CETINKAYA, "Phononic crystal artifacts for real-time in situ quality monitoring in additive manufacturing", Journal of Manufacturing Science and Engineering 139, no. 9, 2017.
10. FELIX H. K. I. M., ET AL NIST Advanced Manufacturing Series 100-16, Literature Review of Metal Additive Manufacturing Defects, May 2018.
11. CHEN, Y., ET AL., "Topical Review, Defect inspection technologies for additive manufacturing", International Journal of Extreme Manufacturing, 3 022002, 2021.
12. VAFADAR, A., ET AL., "Advances in Metal Additive Manufacturing: A Review of Common Processes," Industrial Applications, and Current Challenges. Appl. Sci., 11, 1213, 2021.
13. BOULWARE, P., "In-Process Monitoring Techniques for Laser Powder Bed Fusion," EWI. Report, 2017.
14. Y. A. O., B., ET AL., "Multifractal analysis of image profiles for the characterization and detection of defects in additive manufacturing," Journal of Manufacturing Science and Engineering, 140(3), 2018.
15. GRASSO, M., ET AL., "In-process monitoring of selective laser melting: spatial detection of defects via image data analysis," Journal of Manufacturing Science and Engineering, 139(5), 2017.

16. ABDELRAHMAN, M., ET AL., "Flaw detection in powder bed fusion using optical imaging. Additive Manufacturing," 15, 1-11, 2017.
17. GOH, G. D., ET AL., "A review on machine learning in 3D printing: applications, potential, and challenges," Artificial Intelligence Review, 54(1), 63-94, 2021.
18. QIU, Y., ET AL., "Piezoelectric Micromachined Ultrasound Transducer (PMUT) Arrays for Integrated Sensing, Actuation and Imaging," Sensors, 15, vol. 15, pp. 8020-8041, 2015.
19. BRENNER, K., ET AL., "Advances in Capacitive Micromachined Ultrasonic Transducers," Micromachines, vol. 10, no. 2, 2019.
20. VAKAKIS, A. F., RAHEB, M. E., AND CETINKAYA, C., "Free and forced dynamics of a class of periodic elastic systems," *Journal of sound and vibration,* 172(1), 23-46, 1994.

Technical Background

Additive Manufacturing (AM) is a general class of fabrication in which a three-dimensional article (also referred to as a build) is made by the sequential build-up of layers or portions of material or materials. One or more suitable AM techniques and source materials (e.g., feedstock) may be utilized for making articles (e.g., such as by creating one or more patterns directly on a substrate). The AM approach usually includes a step of selectively depositing material layer by layer. Each layer is formed by tracks of activated materials (e.g., molten materials, liquids, pastes, binders, photosensitive compounds, etc.) deposited with prescribed trajectories.

AM techniques, based on various processes (e.g., fused deposition modeling (FDM), powder bed fusion, material/binder jetting, and photopolymerization), and materials (e.g., metals, polymers, glass, silica, and ceramics), provide a novel ability and flexibility for on-site (local) manufacture of intricate parts and products with mesoscale features from 10 s microns (µm) to several millimeters (mm) and overall sizes up to meters-scale. Thus, it is dubbed a free-form method, implying that the complexity of a product is limited only by the resolution of its manufacturing machine. As a result, AM techniques are often attractive to avoid the need for manufacturing expertise, training, machining, mold making, or tooling.

However, this level of article geometric complexity significantly increases the risk of quality compromises and poses unique and critical defect detection and qualification challenges, requiring specialized Non-Destructive Evaluation/Testing (NDE/NDT) approaches. Significant variability in part quality in AM is often observed due to its line-tracing and layer-by-layer discrete production processes in creating and solidifying streaks of materials. Thus in AM, the development of novel inspection techniques for manufacturing quality assurance is necessary.

Methods of detecting and classifying defects in AM can generally be divided into traditional non-destructive defect detection techniques based on first-principles physics and defect detection technology based on heuristics and Machine Learning (ML). The NDE/NDT of detection technology focuses on abnormality in feedstock (source materials) by detecting the characteristic quantities and works best when an accurate defect model is available. When no such model is available, the adoption and utilization of phenomenological and ad hoc models are needed. As noted by Yao et al. (2018), Grasso et al. (2017), and Abdelrahman et al. (2017), AM defect detection with ML has emerged as a technology that uses advanced equipment and artificial intelligence, and deep learning methods to conduct in-process imaging for defect identification. In Goh et al. (2021)'s view, based on their extensive literature review of current ML techniques, which they categorize into four groups as supervised learning, unsupervised learning, semi-supervised learning, and reinforced learning, the in-situ real-time monitoring of AM processes will significantly benefit from the object detection ability of ML. In AM, multiply physical field variables (e.g., thermal, mechanical, and electrical) interact in a highly nonlinear manner for creating complex solid geometries; thus, the use of deterministic first-principles physical models is extremely limited. Out of all these factors that complicate the in-situ real-time monitoring of AM, geometric complexity is the only factor that can be reduced to simplify the quality monitoring task. A method, a system, and a device are described in the present invention as to how this challenge is overcome by utilizing test artifacts with simple, regular geometries.

In AM-made articles, various types of post-production defects have been observed and reported: layer defects, zones with lack of fusion, isolated and clustered porosity, voids, residual stresses, and high-density inclusions/contaminations (see Felix et al. (2015) for a review and classification of currently known defect types in metal AM and Chen et al. (2021) for typical defect inspection technologies in AM). In addition to such defects, microstructure that changes as a function of location may hamper NDE/NDT inspectability. Such effects need to be taken into account when selecting and validating appropriate inspection approaches. While various post-processing techniques (e.g., stress relief, HIP (Hot Isostatic Pressing), and heat treatment) have been proposed and utilized, many quality challenges remain.

The well-documented critical shortcomings of AM are often summarized as (i) poor surface quality, (ii) low bonding quality and mechanical strength and layer delamination, (iii) limited source material choices, (iv) significantly slow processes compared to some other manufacturing methods such as forging, stamping, or molding techniques, (v) substantial residual stress build-up, (vi) inadequate dimensional tolerances and warpage (due to residual stresses), (vii) internal material defects and irregularities and uncontrolled porosity, (viii) limited process and production repeatability, and (ix) dimensional and form errors.

In filament fusion AM machines, the root causes of fabrication issues can often be traced to the mechanical/defect states of load-carrying fiber-to-fiber/layer-to-layer bonds. In the case of Metal Laser Sintering, root causes of porosities, contaminations, micro-cracks, etc., are still under research, and the disclosed method could help diagnose. If extensive post-production offline quality inspections are required for complex articles, the on-site fabrication advantage offered by AM is no longer attractive.

Another critical quality-related shortcoming of AM is that it is difficult or impractical to inspect the article before completion due often to a hostile production environment and/or the geometric complexity of the article. This situation may result in machine time and material waste, causing a substantial reduction in manufacturing throughput and profitability. Even after an article is completely fabricated, using current NDE/NDT techniques, it may be difficult or impossible to inspect the article due to its geometric complexity and uneven materials and properties distributions. Thus, an article may have a latent defect undetected in a post-manufacturing quality evaluation and may be installed on a machine only to fail, leading to economic losses subsequently. While process control could limit such variability, its effectiveness is often impeded by a lack of adequate process understanding and measurement techniques.

Consequently, current process control is frequently based on heuristics, human experience, and experimental data, yielding limited improvements in quality output. AM lacks in-situ quality inspection capability, which seriously limits the realization of its full potential as a practical on-site manufacturing modality. Currently, its widespread industrial adoption in critical applications is often challenged by quality and consistency concerns. If extensive post-production offline quality inspections are required for a complex article, the on-site fabrication advantage that AM offers is no longer attractive. Moreover, virtually all existing standard NDE/NDT techniques today are of limited values to AM, as they are developed for relatively simple geometries and waveguides (e.g., plates, disks, pipes, etc.), as irregular boundaries pose serious detection difficulties for NDE/NDT techniques based on wave propagation. There also remains a need for a system that provides real-time automatic alteration of processing conditions based on monitoring information about the layer manufacturing of a 3D article, leading to an independent closed-loop system. Such a system would have the potential to reduce the complexity and overall size of the AM machine.

As detailed in a series of recent review articles by Everton et al. (2016) and Grasso and Colosimo (2017), and technology reports by Mani et al. (2015) of NIST (the National Institute of Standards and Technology), Waller et al. (2014) of NASA (the National Aeronautics and Space Administration), Chen et al. (2021), and Vafadar et al. (2021) on in-situ process monitoring, currently quality issues form a serious roadblock for high-value products and its wide-scale adoption. Felix et al. (2018) of NIST has conducted and published a list of defect types observed in metal AM. In addition, various standard and roadmap development efforts are reported (for example, see AMSC (the Additive Manufacturing Standardization Collaborative) Roadmap and ASTM (the American Society for Testing Materials) Work Item (Number 56649)). In the AMSC Roadmap, various aspects of the disclosed method, system, and device have been identified as technology gaps.

At present, there are methods and systems for monitoring and assessing AM processes based on the utilization of test artifacts. Manufacturing a test artifact enables a composite test since most of the errors present in the materials, AM machine, and processes contribute to the errors in the final product. Several test artifacts for formal standardization have been proposed and utilized, as summarized and discussed in a NIST report by Moylan et al (2012). With such a well-designed standardized artifact, the performances of different machines and processes, or source materials that produce the same standardized artifact may be compared.

The utilization of testing witness coupons in AM is particularly valuable as part of an AM production process and as a post-production quality assessment technique. In this testing approach, a standard design for a testing coupon (see a NIST report by Moylan et al. (2012) for specific coupon examples), which is small compared to the actual article to be built, is often examined before and after production to make certain that the utilized AM machine, AM processes, and material(s) are performing as expected. This approach is adopted to receive relatively rapid feedback on whether or not the AM machine is producing acceptable results from a defect and mechanical properties perspective.

In addition, coupons, which are cut directly from articles, could also give a more direct indication of AM process stability and article quality.

However, presently, the ultimate function of an available test artifact is limited to test the ability of an AM machine in its reproducing geometric features, not necessarily other critical properties such as mechanical strength, bonding strength, fusing strength, structural integrity, internal defect types and states, and optical and electromagnetic properties, and their spatial distributions. Thus, its utilization is limited.

SUMMARY OF THE DETAILED DESCRIPTION

The present invention seeks to improve upon a prior test artifact-based quality monitoring method for AM processes and machine learning algorithms by providing a unique method, system, and device for inspection of articles utilizing a novel class of two- and three-dimensional (2D and 3D) test artifacts with periodic internal and surface structures, which are to be built in an AM machine while its progress is monitored with the aid of elastic waves and near- and broad-field sensors.

As the following discussion will illustrate, the present teachings relate to a method, system, and device for performing real-time in-situ inspection and quality monitoring of a 3D test artifact comprising several disclosed steps, and offers a method for making the uses deterministic first-principles physical models and ML techniques as predictive tools possible in AM. In an embodiment, a design method of the test artifact is provided. The spectral characteristics of waves propagating in the artifact's interior are altered by its propagation medium's mechanical, physical, and geometric properties. Consequently, the analysis of the spectral response of the artifact has the potential to reveal information about both its internal structures and surface patterns and the properties of materials. However, the spectral analysis of complex geometries and its direct application offers limited insight; thus, special care needs to be taken in designing test artifacts. It is known that a periodic structure can disperse waves and create pass- and stop-bands in its frequency spectrum depending on its geometric arrangement, interfacial properties, and mass distribution, as well as defect states, even if materials involved do not necessarily include any imperfections and/or dissipation mechanisms. In addition, even minor perturbation level defects in a periodic structure may have significant observable effects in its spectral response, thus can be detected from the properties of received waves.

In another embodiment, a real-time in-situ monitoring method utilizing the spectral and dispersive characteristics of wave propagation and field sensor data in a specially designed test artifact consisting of repeating sub-structures is disclosed. For example, it may be utilized to monitor and assess the fiber-to-fiber and layer-to-layer bond quality and strength—not only for geometry but also for mechanical strength and physical defects. While the embodiments of the invention described in the present invention refer to the formation of a pass and stop bands in spectral-domain as a sensing mechanism, the present invention is not so limited in this regard.

As detecting waves travel significantly faster than typical AM deposition speeds, the disclosed approach may lead to rapid real-time monitoring with no or minimal interactions with the fusion process. At process control, monitoring, and inspection levels, the probing knowledge required to implement such an approach is generally absent. The disclosed invention provides a method, system, and device for this unfulfilled real-time in-situ monitoring need.

Those skilled in the art will appreciate the scope of the disclosure and realize additional aspects thereof after reading the following detailed description of the preferred embodiments associated with the accompanying drawing figures.

BRIEF DESCRIPTION OF THE DRAWINGS

The accompanying figures, in which like reference numerals refer to identical or functionally-similar elements throughout the separate views and which are incorporated in and form an article of the specification, further illustrate the present invention, and together with the detailed description of the invention, serve to explain the principles of the present invention. So that those skilled in the art to which the subject disclosure appertains will readily understand how to make and use the devices and methods of the subject disclosure without undue experimentation, embodiments thereof will be described in detail hereinbelow with reference to certain figures, wherein.

DETAILED DESCRIPTION

Figure 1:
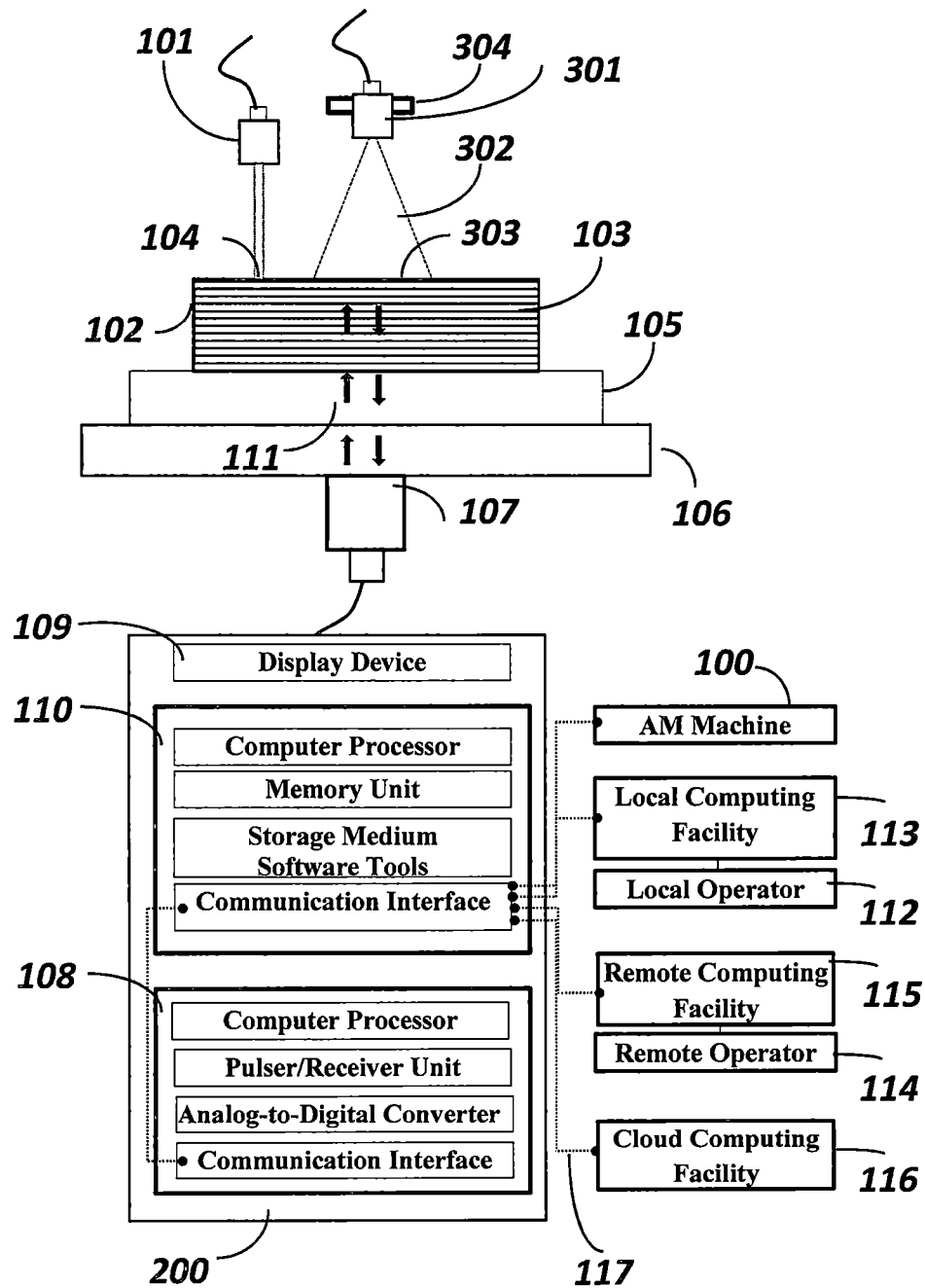
FIG. 1 is an overall view of the components of the disclosed system and its control system, according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the invention disclosed in U.S. patent application Ser. No. 15/731,366 are described with respect to fused deposition modeling (FDM) with a filament made of the material of Poly(lactic acid) (PSL) and test artifacts made by FDM, embodiments of the invention are also applicable to sintering and to other AM processes and techniques and test artifacts made by those processes and procedures. Although exemplary embodiments of the described 3D artifacts are in the shapes of cube and cuboid, embodiments of the invention are also makeable with other 3D geometric shapes. In other embodiments, surface structures and features such as single tracks or complex two geometric patterns on the surface of a multi-mode waveguide are also usable as two-dimensional (2D) test artifacts. Moreover, embodiments of the invention are not limited to industrial applications and may generally be instrumental for AM and 3D printing. In addition to FDM, particular embodiments may be suitable for use with Selective Laser Melting (SLM), Direct Metal Laser Melt (DMLM), Direct Metal Laser Sintering (DMLS), Vat photopolymerization, Material Jetting, Binder Jetting, Sheet Lamination, pharmaceutical and biopharmaceutical product printing, and bioprinting and biofabrication AM techniques.

Elastic wave motion in a medium with a mass density distribution in which, when its particles are displaced, a force proportional to the displacement acts on the particles to restore them to their original position. If the particles in a particular region are set in vibratory motion, an elastic wave propagates. Elastic wave motion is often a multi-mode propagation depending upon its wavelength and the geometry of its conduit. An infinite solid medium supports only two wave modes (referred to as pressure and shear) traveling at their unique velocities. These modes are often referred to as bulk waves. However, a plate supports two infinite sets (referred to as symmetric and anti-symmetric) of Lamb wave modes, whose velocities depend on the relationship between wavelength (or frequency) and plate thickness. Other guided wave modes of elastic wave propagation included surface acoustic waves (SAW) in a half-space and interface or boundary (Stoneley) waves along with the interface of two bonded half-spaces. Rayleigh waves are a type of surface wave that travel near the surface of solids. Rayleigh waves include both longitudinal and transverse motions that decrease exponentially in amplitude as the distance from the surface increases. There is a phase difference between these component motions. This type of multi-mode elastic waves is often known as guided waves.

A transducer is a device that converts energy from one form to another. A piezoelectric transducer can convert electrical energy into a traveling strain wave pulse and vice versa. To image, test, or interrogate a large volume of material, a conventional (single-element) probe (transducer) must be physically scanned (moved or turned) to sweep the beam through the area of interest. In contrast, the beam from a phased array probe (transducer) can be focused and swept electronically without moving the probe. The beam is controllable because a phased array probe comprises multiple small elements, each of which can be pulsed individually at a computer-calculated timing. Multi-mode wave propagation can be initiated by a single-element transducer or a phased-array probe/transducer.

Conventional single-element piezoelectric transducers with crystal and composite material active elements are used mainly in ultrasound and NDE/NDT applications. While lead zirconate titanate (PZT) crystal and composite materials have been widely used in traditional piezoelectric devices due to their favorable piezoelectric properties, they have several disadvantages, such as the lead component in the compound, aging deformation, and high annealing/deposition temperature. Therefore, their fabrication process is CMOS (complementary metal-oxide-semiconductor) microprocessing/manufacturing incompatible. In the past two decades, micro-machined ultrasonic transducers (MUTs) have been developed and utilized in several medical imaging and consumer electronics applications, such as handheld/catheter-based medical devices and fingerprint sensors for smartphones. In general, MUTs operate in two different mechanisms, capacitive force or piezoelectric sensing-actuation as in capacitive force micro-machined ultrasonic transducers (CMUT) and piezoelectric micro-machined ultrasonic transducers (PMUT), respectively (see Qiu et al. (2015) and Brenner et al. (2019) for processing details and applications). PMUTs and CMUTs are both in the category of flexural transducers. CMUT and PMUT transducers can be fabricated as phased array probes for multi-mode elastic wave generation and/or for beamforming and focusing. MUTs have been introduced as competitors to the conventional piezoelectric transducers due to their key advantages in modern applications, including the ease of integration with front-end electronics (CMOS integration), impedance matching, wide bandwidth, and high coupling coefficient. Additionally, MUTs are fabricated using conventional low-temperature micro-machining techniques making the CMOS-MUT integration process substantially easier and cheaper at scale than bulk piezoelectric-CMOS integration.

Electromagnetic acoustic transducer (EMAT) is a type of transducer for non-contact acoustic/ultrasonic elastic wave generation and reception in conducting materials. Its effect is based on electromagnetic mechanisms, which need no direct coupling or contact with the material's surface. Due to this couplant-free feature, EMATs are particularly useful and desirable in harsh and extreme environments (such as hot, cold, clean rooms, and/or dry).

Electric arcs or sparks are produced by applying a high voltage between a short point-to-point gap in the air. The generation of ultrasonic pressure pulses with electric arcs is possible.

An interferometer is an instrument that compares the position or surface structure of two objects, thus used for surface motion and topography measurements. Various types of interferometry (such as electronic speckle pattern, holographic, self-mixing laser, low coherence) are available. A vibrometer often refers to a two-beam laser interferometer that measures the frequency (or phase) difference between an internal reference beam and a test beam. A Laser Doppler Vibrometer (LDV) is a scientific instrument used to make non-contact vibration measurements of a surface. The LDV laser beam is directed at the surface of an object, and the vibration amplitude and frequency are extracted from the Doppler shift of the reflected laser beam frequency due to the motion of the surface.

For thermographic (thermal) imaging, several significant limitations have been reported: (i) Emissivity is often different for the melt-pool, unconsolidated powder, and solidified surface, so a thermal image composed of all three components could give ambiguous temperature predictions, (ii) only radiation sensor systems with narrow bandwidth may be used accurately, and (iii) debris from the heat-affected zone can block a viewport used in an AM imaging system and alter temperature measurements by changing radiation transmission. Residual stress measurements have also been considered for determining the mechanical state of a build. Still, it is highly challenging to apply direct methods (e.g., neutron transmission/diffraction, X-ray diffraction) due to difficulties associated with cost, limited availability, and bulky equipment size. Indirect methods monitor physical attributes manifesting strains and residual stresses, such as surface distortion and strain gage measurements (offline/in situ). Unfortunately, such methods are often impractical for real-time in-situ monitoring applications, as sensor bonding to the build is required and/or instruments are bulky and slow.

These and other embodiments are discussed below with reference to FIGS. 1-8; however, those skilled in the art will readily appreciate that the detailed description given herein with respect to these figures is for explanatory purposes only and should not be construed as limiting. The flowchart discussed herein is necessarily discussed in some sequence for illustration purposes, but unless otherwise explicitly indicated, the embodiments are not limited to any particular series of steps.

With reference to FIG. 1, a system for inspecting an AM system in making a specific 3D test artifact according to a preferred embodiment of the present invention is illustrated. In an embodiment, the test artifact is a 2D test artifact. In an embodiment, the AM machine 100 may be an FDM AM machine of the type known in the art. For example, the AM machine may include a process chamber with a build plate. Located in the process chamber, in the area of the build-up chamber, is a scanning device that directs a deposition head 101 of the AM machine towards a test artifact 102 with an internal texture 103 of, softening, melting, and depositing activated material 104 on a delay line 105 placed on a build plate 106. Material is energetically activated for re-shaping and bonding. The deposition head 101, the scanning device, and a drive mechanism are typically electrically connected to the control unit of an AM machine 100. The activated material 104 deposited on the test artifact 102 is provided by a source material stored in the AM machine 100.

The system instruments 200 of the present invention drive an elastic wave transducer 107 driven by an excitation unit 108 with a display device 109, as shown in FIG. 1 for an embodiment. To manufacture the test artifact 102 on its delay line 105 mounted on the build plate 106 of the AM machine 100, for example, the test artifact coordinates are first entered three-dimensionally, that is, in individual z-direction divided cuts, into the processing unit of the AM machine 100. In an embodiment, the input unit for artifact data may be a computing device 110. In an embodiment, the input unit for artifact data may be a local computing facility 113. In an embodiment, the input unit for artifact data may be a remote computing facility 115 accessed by a remote operator 114. In an embodiment, the input unit for artifact data may be a Cloud-based computing facility 116. In an embodiment, the computing device, the local computing facility 113, the remote computing facility 115, and the Cloud-based computing facility 116 are capable of access to the Internet by wired and/or wireless means. In an embodiment, cloud-based computing is a type of Internet-based computing service that provides shared computer processing software resources and data to computers and other computing devices on demand.

The test artifact 102 with internal texture 103 is used to predict the quality of an article made with the AM machine 100, its processes, and its source material 104. A specially designed test artifact enables a composite test for the article made by the AM machine 100 and monitored by an array of transducers 107 exciting the base plate 106 and the delay line 105 and field sensors 301 with a narrow or wide field-of-view 302 and a sensing area 303. A motorized motion platform of the tracker system 304 houses one or more field sensors. 301 Generally, the geometry and internal texture 103 of a test artifact are simpler than those of an article for which the test artifact is designed to verify and validate. In an embodiment, the disclosed process uses a test artifact with an internal structure to study only the strength of fiber-to-fiber bonds by isolating the process from other geometric and process complexities is utilized. In an embodiment, one or more field sensors 301 mounted on a motorized motion platform of the tracker system 304 track the fusion spot or the vicinity of the source material 104 by directing their sensing areas to the area of interest. In an embodiment, one or more field sensors 301 acquire measurements along a predefined path on the surface of a test artifact. The periodic structure utilized for the internal features of a test artifact is designed with the aid of a CAD Computer-Aided Design (CAD) software product as a high-porosity rectangular prism with a regular orthogonal fiber placement arrangement. The output of the design process is a digital model representation file that is processed to obtain a set of instructions stored in a layer-by-layer geometric representation (GR) file. A GR file is processed by an AM machine to build an object, such as a test artifact or an article. One standard format for GR files is G-code.

However, in one embodiment, the geometry of a test artifact may be other than cube and cuboid. In one embodiment, the geometry of a test artifact may be 2D.

Figure 2A:
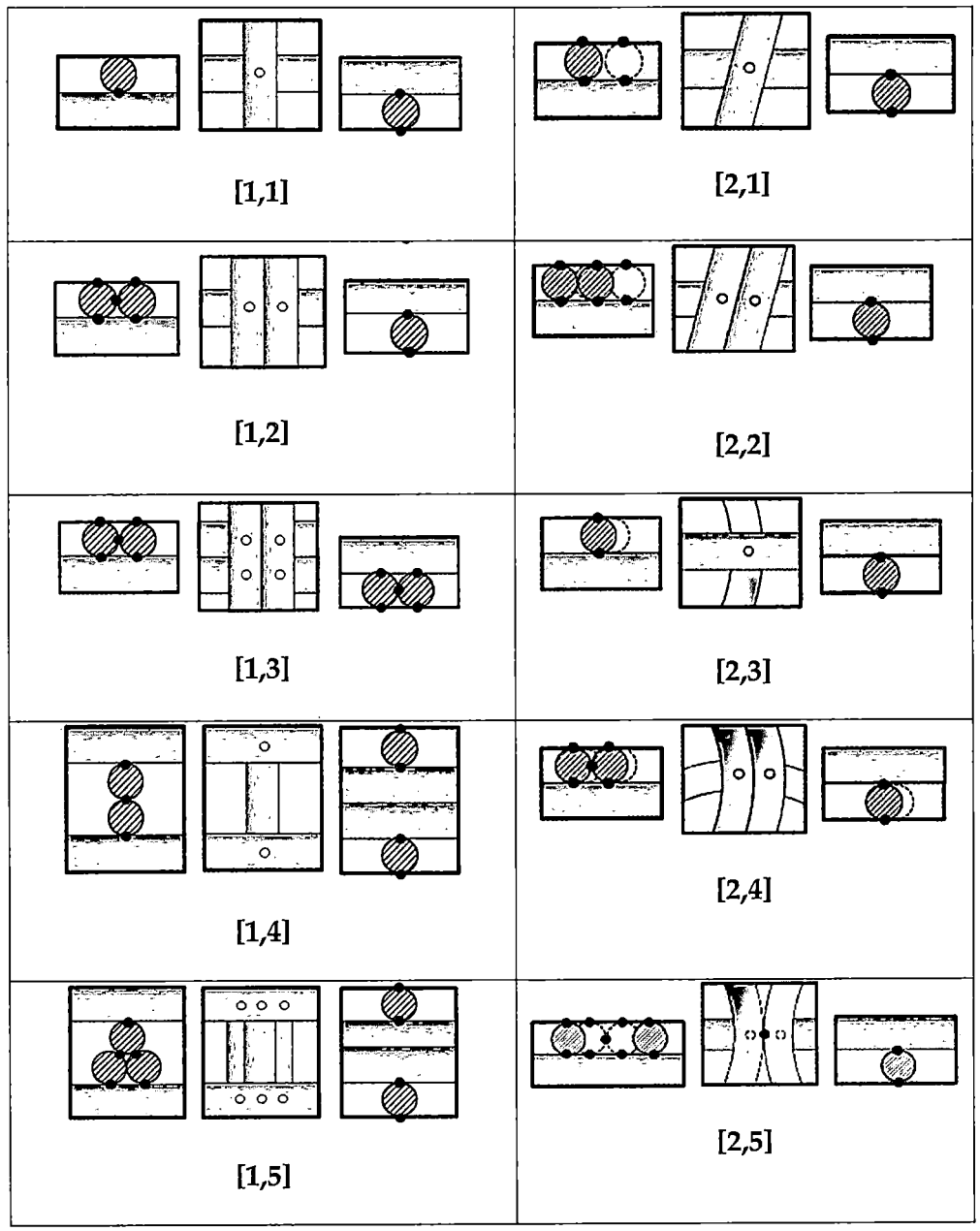
FIG. 2A is the front, top and side views of sample primitive unit cells with circular tracks to construct two- and three-dimensional test artifact models with increasing topological complexities, according to one embodiment.
Figure 2B:
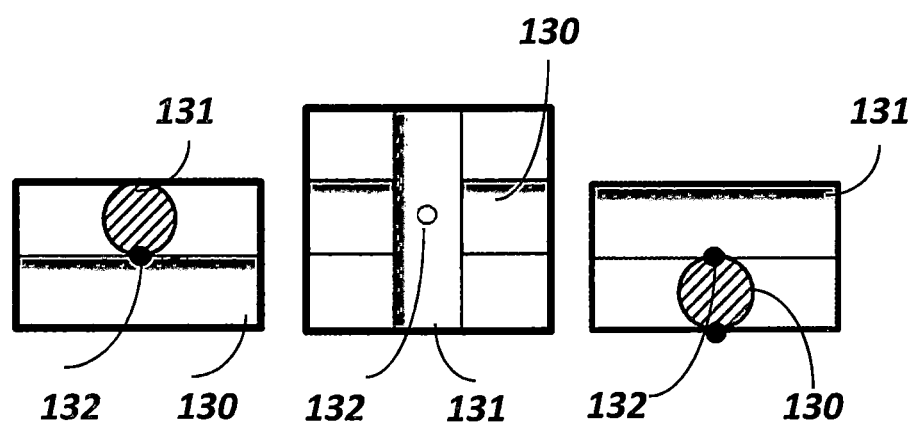
FIG. 2B is a close-up of the two-layer primitive unit cell [1,1].

In FIG. 2A and FIG. 2B, the cross-section image showing several possible placement patterns of in-plane fibers 130 and out-of-plane fiber 131 bonded by bonding zones 132 is presented as examples. In one embodiment, a set consisting of one in-plane fiber layer and one out-of-plane fiber layer forms a repeating periodic set. In one embodiment, the combinations of patterns are utilized. In one embodiment, patterns with more than two layers are utilized.

Figure 3A:
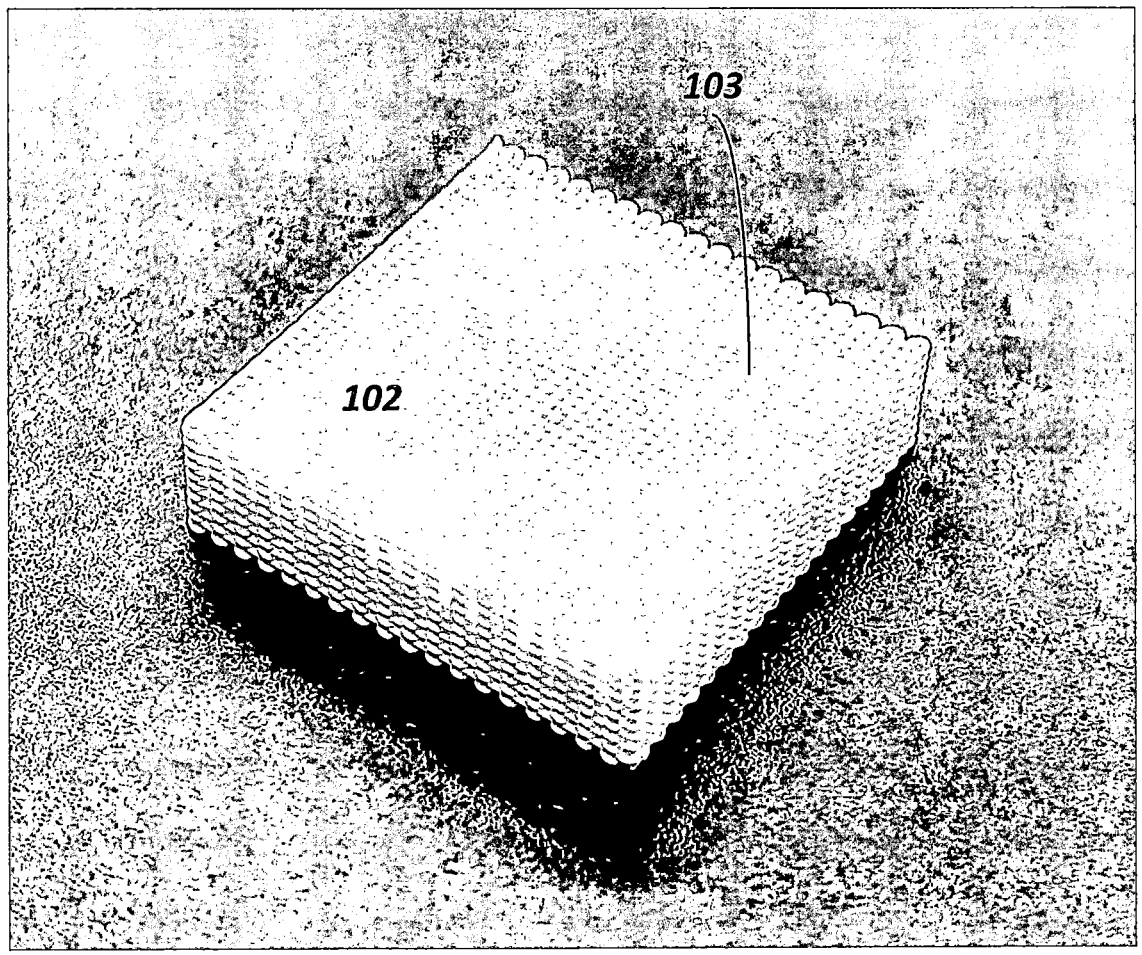
FIG. 3A is the photograph of a 3D printed prism-shaped test artifact with the primitive unit cell [1,1] (see FIG. 2A) consisting of repeating grid sub-structures made of polymer material, according to one embodiment.
Figure 3B:
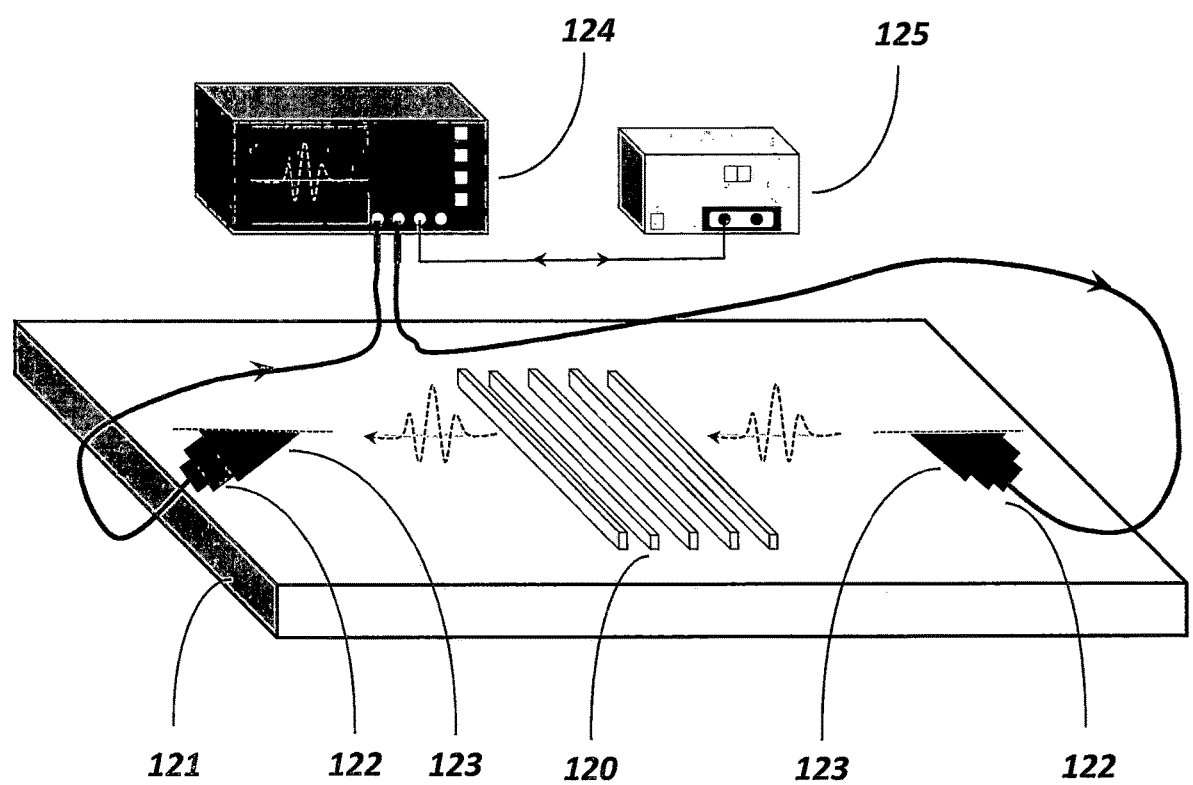
FIG. 3B is the photograph of a 3D printed multi-mode guided wave test artifact consisting of repeating parallel tracks made of polymer material printed on a waveguide delay line (e.g., a glass plate) and the instruments of the experimental set-up, according to one embodiment.

In one embodiment, with the present invention, the geometries of 2D and 3D test artifacts 120 and 102 in FIG. 3A and FIG. 3B, respectively, are simplified so that their predictive analysis is possible with the uses of available deterministic first-principles physical models and/or ML techniques. In one embodiment, a combination of 2D and 3D test artifacts are utilized in the same monitoring system of FIG. 1.

In one embodiment, manufacturing materials may be arranged in arrangements other than orthogonal fiber placement arrangement. The geometric design is represented as a digital (solid) model representation file and often saved in Stereolithography (STL) file format. This file is imported into a 3D printing slicing software product for creating desired periodic internal structures 103 for a 3D test artifact, in the file format of a Numerical Control (N.C.) programming language RS-274 (also referred to as G programming language). Its file format is G-code.

In one embodiment, the 3D test artifact placed on the surface of a delay line 105 that is built on the build plate 106 of the AM machine 100, along the side of an article. A transducer 107 is mounted on the bottom of the build plate. In one embodiment, the test artifact is an integral part of an article.

A transducer is a device that converts variations in a physical quantity, such as elastic and strain waves, brightness, or electromagnetic waves, into an electrical signal or vice versa. In one embedment, the transducer is for elastic waves. In another embedment, the transducer is for electromagnetic waves. In another embedment, the transducer is for light waves. The center of the test artifact is aligned with the center of the transducer. In another embedment, the surface of a transducer may be used as a build plate for the test artifact, eliminating the transmission of waves through the build plate of the AM machine 100. In another embodiment, a test artifact is built and inspected prior to the initiation of building an article. In another embodiment, a test artifact is built simultaneously with an article, allowing the control unit of the AM machine 100 to make a real-time adjustment to its process parameters and the article representation data file according to a set of pre-determined monitoring objectives. In another embodiment, a delay line may be printed by the AM machine 100 directly on the transducer surface as part of the test artifact print job. In another embodiment, the transducer, delay line, and test artifact may be printed by the AM machine 100 as a single print job. In another embodiment, the delay line and test artifact may be printed by the AM machine 100 as a single print job on an article.

FIG. 1 is a side view diagram of the system components, according to one preferred embodiment. Waves 111 with a particular bandwidth of 0.72-2.3 MHz are initiated by an electrical pulse generated by the pulser/receiver unit of the excitation instrumentation group 108, which is controlled by a computing device 110. In one embodiment, waves reflected and scattered from the geometric features, and material distribution in the test artifact are sensed by the same transducer 107. A waveform corresponding to the waves 111 coming from the test artifact is digitized in a device connected to the computing device 110 of the monitoring system 200. The received waveform in digital form is stored in the storage medium of the computing device 110.

The computing device 110 may be connected to one or more of the following: a local computing facility 113, a remote computing facility 115, and a cloud-based computing facility 116. A communication link 117 is utilized connecting the computing device of the monitoring system 200 to each available computing facility. In one embodiment, a communication link 117 between the computing device 100 and a computing facility may be wireless. The local computing facility 113 is monitored and managed by a local operator 112 on the site of the AM machine 100, thus called local. The remote computing facility 115 is monitored and managed by a remote operator 114. According to one embodiment, each computing facility consists of a computational processor, a memory unit, a communication interface that is in constant communication with each other, the computational facility of the AM machine 100, and the computing device 110.

A field sensor 301 with a field-of-view 302 is shone on a sensing spot or a sensing area 303 and acquires field measurement data from the surface of a three-dimensional test artifact (as shown in FIG. 1), according to one embodiment. According to one embodiment, the field sensor 301 with a field-of-view 302 is focused on the surface of a 2D test artifact (as shown in FIG. 3B). According to one embodiment, the field sensor 301 is a narrow field-of-view sensor. According to one embodiment, the field sensor 301 is a wide field-of-view sensor. According to one embodiment, one or more field sensors 301 may be employed. In one embodiment, the digitizing oscilloscope 125 and the pulser/receiver unit 124 of the excitation instrumentation group 108 are utilized as stand-alone instrument components. In one embodiment, the digitizing oscilloscope 125 and the pulser/receiver unit 124 of the excitation instrumentation group 108 are integrated as a single unit.

In one preferred embodiment, a test artifact with a grid periodic structure 103 for extracting the effect of print speed on the spectral properties of received waveforms 111 is built. According to another embodiment, a 2D or 3D metal test artifact may be built.

In FIG. 3A, an optical image of a test artifact is depicted with a grid representing the intended fiber placement pattern to illustrate the extent of print error, according to one embodiment. In one embodiment, the geometry of a test artifact may be other than cube and cuboid. In one embodiment, manufacturing material arrangements may be other than orthogonal fiber placement arrangements. In one embodiment, the 2D test artifact 120 is placed on the surface of a waveguide 121, and the multi-mode wave transducers 122 with a wave wedge delay line 123 are bonded on the waveguide surface 121, as shown in FIG. 3B.

Figure 3C:
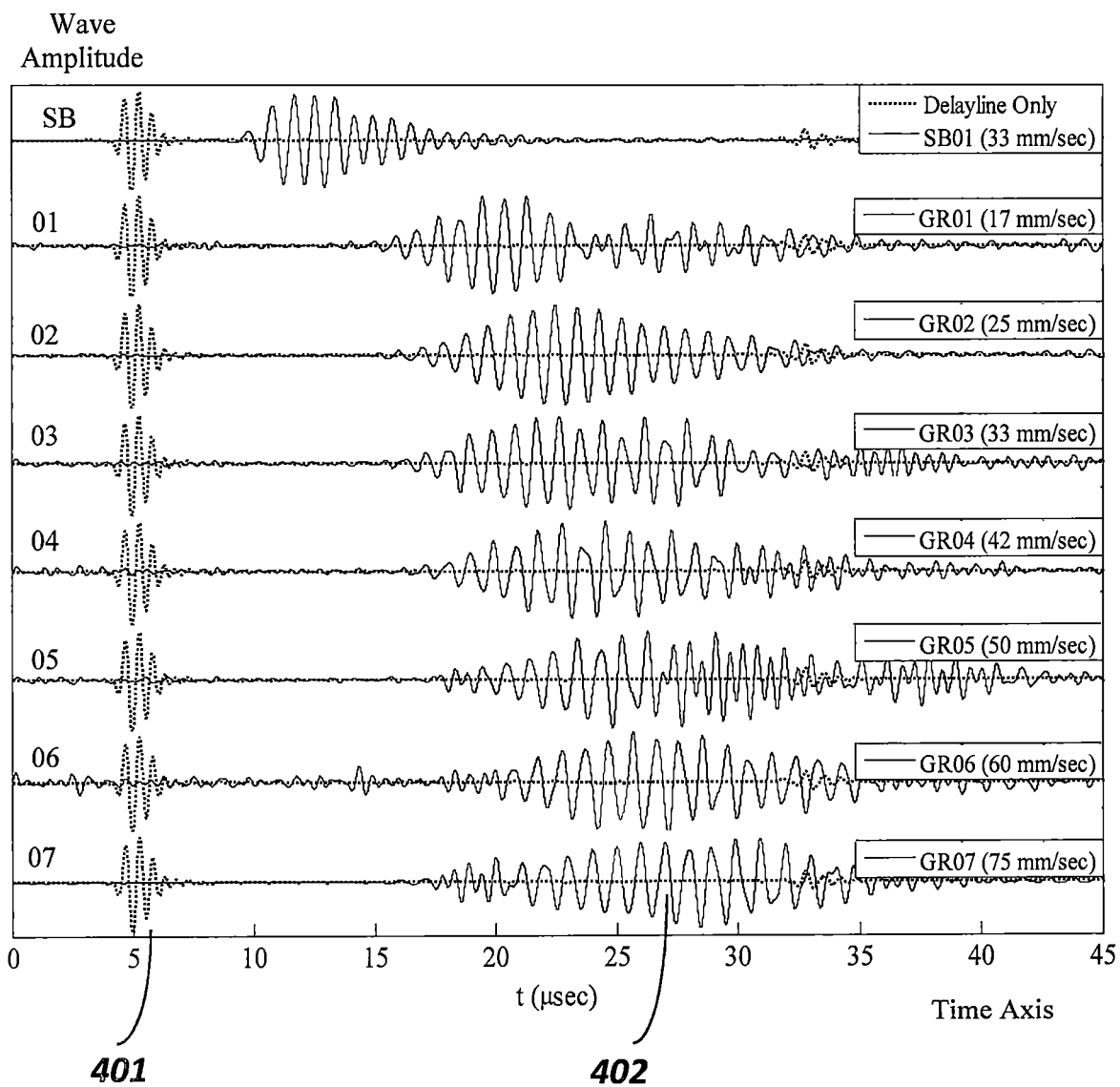
FIG. 3C is a plot of the cascaded waveforms for a set of test artifacts (named GR01-07) made at seven different print speeds according to one embodiment (after Xu et al. (2017)), according to one embodiment.

In FIG. 3.C, waveforms consisting of a main bang 401 and arrival wave 402 obtained for each periodic set are depicted. Waveforms acquired for the first layer at various extrusion speed levels ($v_p$=17, 25, 33, 42, 50, 60, 75 m/s) for the test sample set, GR01-07, according to one embodiment, and 33 mm/sec for a solid sample made of the same materials with 100% fill ratio (SB01), respectively, are depicted in FIG. 3C. In this preferred embodiment, the print speed is the only process parameter which is varied, and all other AM process and materials are kept constant during manufacturing. In FIG. 3C, in one preferred embodiment, the real-time acquired temporal waveforms may be employed to visually examine the potential relationship between the time-of-flight (ToF), print layer number, and attenuation of the ultrasonic pulse. The expected round-trip ToF (RToFs) for each printed sample is estimated from the offline measurements. The pulse-echo mode results in RToF is twice the ToF measured in the pitch-catch mode. The RToF of each sample was to shift right with the increase in the print layer. In FIG. 3C, the reflection of the print layer interface shifted right with the increase in a print layer.

The increasing trend of the RToF corresponds to the increase in the thickness of the sample. The pulse signal attenuates when transmitted through the structure due to its periodic structure with geometric and mechanical variations and defects of bonds and fibers. In FIG. 3C, the temporal response waveforms for each level of the set extrusion speed ($v_p$) are depicted. Processing the acquired waveforms, ToFs provide the pressure wave velocity in a sample by $c_L$=h/Δt where h is the sample thickness at the time of print.

Figure 4:
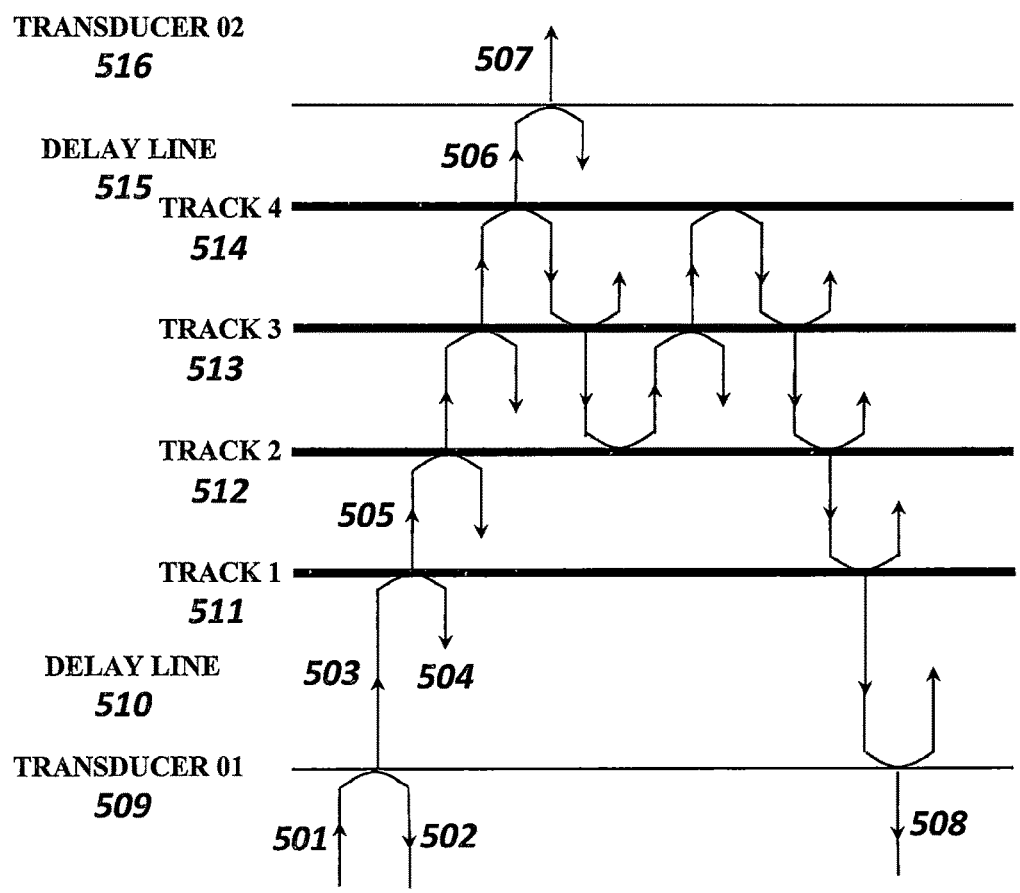
FIG. 4 is a ray-tracing diagram of the transmitted and reflected waves in a two-dimensional test artifact with four tracks on a waveguide substrate, according to one embodiment.

In FIG. 4, a ray-tracing diagram is presented for a 2D test artifact deposited on a waveguide substrate 121, showing an initial pulse 501 generated by the first transducer 509 and its propagation into the periodic test artifact structure 120. In this embodiment, the periodic test artifact structure 120 consists of four tracks (or beads): the first track 511, the second track 512, the third track 513 and the fourth track 514. In AM, a track is also referred to as a bead. The delayline reflection 502, the pulse 503 in the first delay line 510, the reflected pulse 504 from the first track 511, the transmitted pulse 505 passing the first track 511, the transmitted pulse 506 after the last track of the test artifact, and the received pulse by the second transducer 516 are as shown. The first transducer 509 captures a waveform 508 that is a composite of several transmissions and reflections in the test artifact. The second transducer 516 placed after the second delay line 515 captures a waveform 508 that is a composite of several transmissions and reflections in the test artifact 120. Subsequent wave dispersion depends on the stiffness of fiber material deposited on the waveguide substrate 121, the coupling properties of fiber-substrate bonds, and imperfections and defects in processes, materials, and the shapes of bonding zones 132. As predicted from the wave propagation principles of guided waves in a waveguide with a deposited periodic structure, these effects express themselves in the spectral and dispersive representations of acquired waveforms (507 and 508) by the first 509 and second 516 transducers 509, as shown in FIG. 5.

Figure 5:
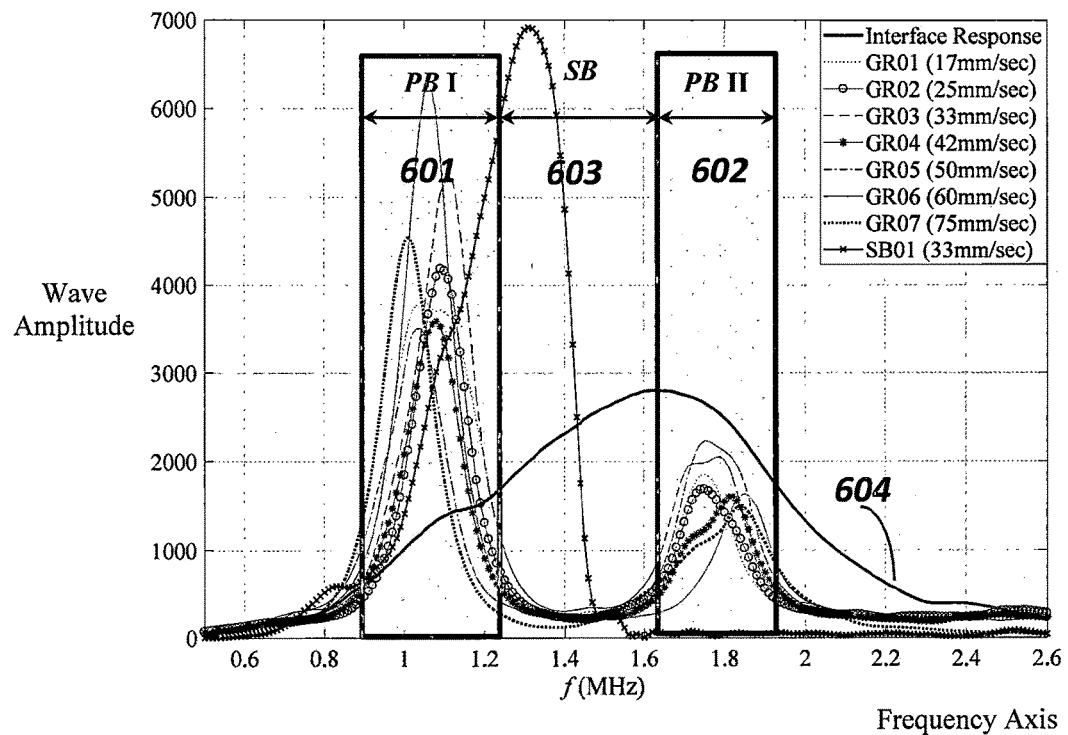
FIG. 5 is a plot of the cascaded spectral responses of three weakly coupled bi-layer periodic structures indicating their pass and stop bands (with decreasing layer-to-layer elastic coupling), included as an illustration of the effect of structural periodicity and properties on spectral responses, according to one embodiment (after Vakakis et al. (1994))

According to one preferred embodiment, the temporal responses for a sample set and the solid reference are transformed into its spectral domain by employing the Fast Fourier Transform (FFT) routine, as depicted in FIG. 5, where two pass-bands (PBs) (601 and 602) and a stop-band (SBs) (603) in the transducer bandwidth 604 are formed, indicating the clear effect of the test artifact. In one embodiment, one or more stop-bands are realized and utilized.

Figure 6:
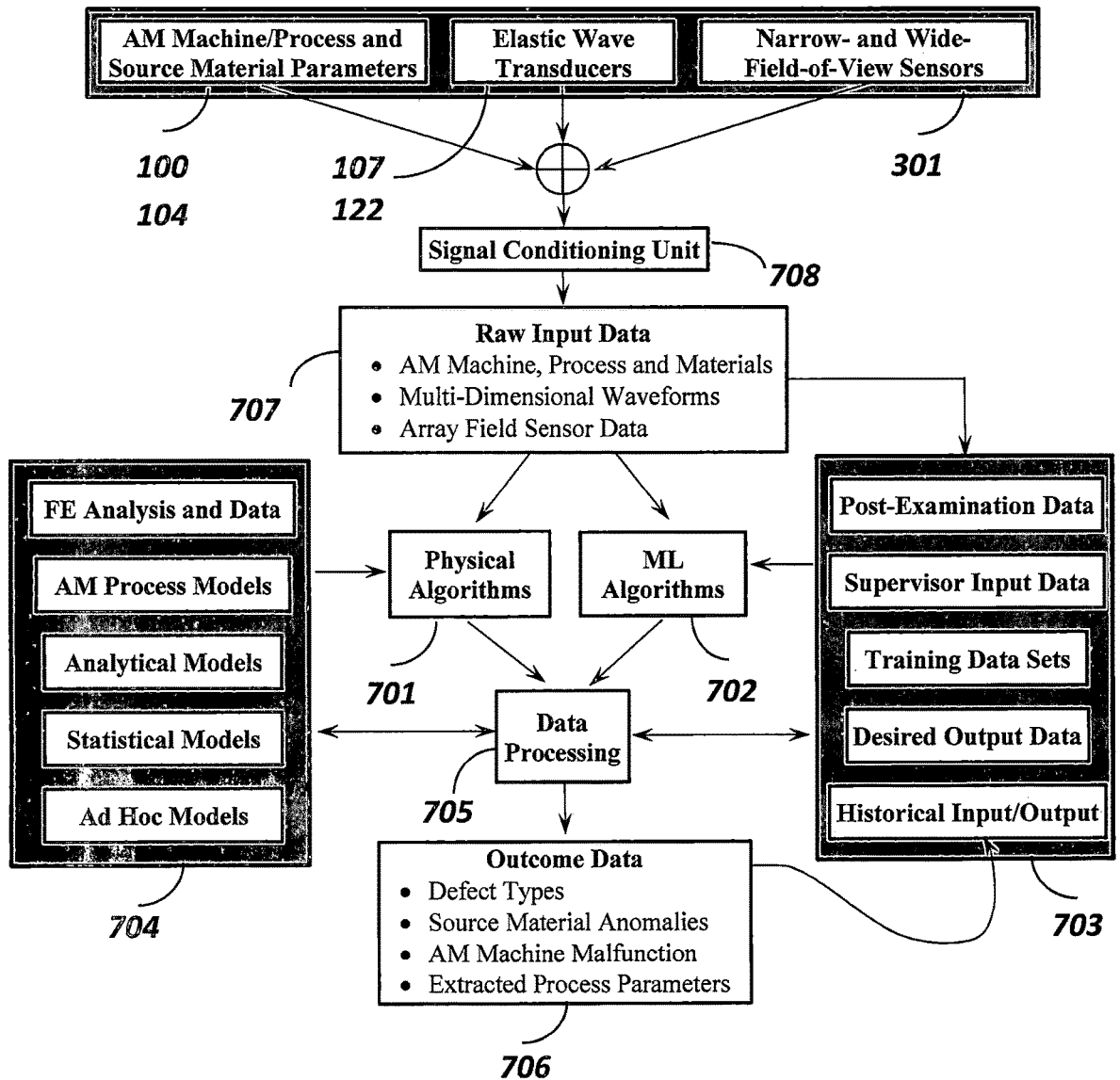
FIG. 6 is the flow chart of processing of elastic wave transducer and field sensor data for predicting print errors and quality using ML techniques and first-principles based deterministic models.

According to one preferred embodiment, in FIG. 6, the computational process flow chart for the transmission and processing of the raw input data 707 from the elastic wave transducers 107 or 122 and the field sensors 301 for predicting and classifying the print errors of an AM machine 100 with its feedstock 104 and quality by utilizing a set of first-principles based physical algorithms 701 and ML algorithms 702 in connection with in the data storage facilities 703 and computing software tools 704. The execution of physical algorithms 701 and ML algorithms 702 are conducted by a data processing unit 705 whose output is an outcome data set 706. Before included in the raw input data set 707 and stored in the data storage facility 703, sensor data is signal-conditioned by a signal conditioning unit 708. The raw input data set 707 including the array sensor data, the state parameters of the AM machine, and its process information for the physical 701 and ML 702 algorithms, as well as the data utilized and generated by the physical models and associated computing software tools 704 are structured, formatted, and stored in the data storage facilities 703.

In one embodiment, the data storage facilities 703 contains the post-examination data from inspections of artifacts and articles which were printed prior to the current examination cycle, supervisor input data, training data sets for ML and historical input/output data sets for the ML algorithms 702, and the desired output data set defined by the local 112 and remote operators 114 for a process being monitored. The local 112 and remote operators 114 have read-and-write access to the data storage facilities 703. In one embodiment, the data storage facilities 703 are cloud-based and are part of the Cloud computing facility 116. In one embodiment, the processing unit 705 executes the physical 701 and ML algorithms 702 for extracting relevant features and trends in the raw input data set 707 for real-time in-situ monitoring and characterization objectives defined in the desired output data in the data storage facilities 703.

In one embodiment, these features and trends are utilized for determining the states of an AM tool and its feedstock and the associated AM process parameters 706. In one embodiment, these features and trends are used for assessing the quality of the article being built in real-time in-situ and its defect types 706. In one embodiment, these features and trends are used for predicting the presence and level of surface roughness in a test artifact. In one embodiment, these features and trends are used for predicting the presence and level of shrinkage ratio in a test artifact. In one embodiment, these features and trends are used for predicting the presence and density of porosity in a test artifact. In one embodiment, these features and trends are used for predicting the presence and density of keyhole porosity in a test artifact. In one embodiment, these features and trends are used for predicting the presence and level of residual stresses in a test artifact. In one embodiment, these features and trends are used for determining the accuracy of printing and track or bead placement. In one embodiment, these features and trends are used for determining the accuracy of track or bead widths and their change over a pre-defined distance and track segment. In one embodiment, these features and trends are used for determining the accuracy of melt pool width and its change over a pre-defined distance and track segment. A list of currently available ML methods and corresponding input parameters for the above-mentioned specific detection objectives are included in Goh et al (2021). In one embodiment, these features and trends are used for determining and detection of a user-defined defect or defects, so the present invention is not limited to any of these defect types or detection objectives.

In one embodiment, the data processing unit 705 is cloud-based. In one embodiment, the data processing unit 705 is connected to the computing device 110 for coordinating the operations and tasks of both units. In one embodiment, the tasks of the data processing unit 705 are executed in the computing unit 110.

Figure 7:
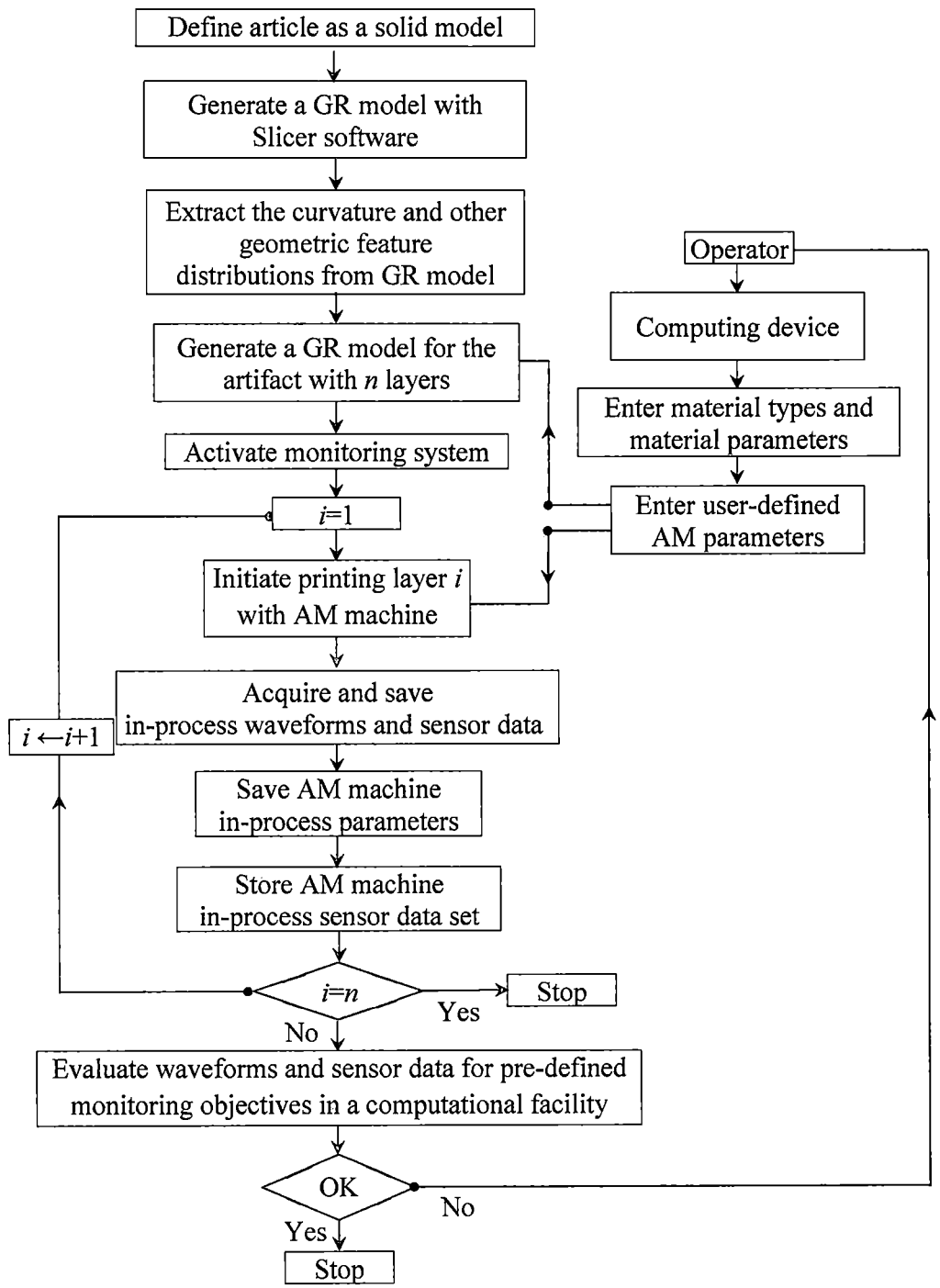
FIG. 7 is the flowchart of the overall disclosed inspection method and system for AM, according to one embodiment; and, FIG. 8 is a classification of ML techniques utilized in article design for AM, process and path optimization, and in situ monitoring for quality control (after Goh et al. (2021)).

In FIG. 7, the flowchart of the overall disclosed inspection method and system for AM, according to one embodiment. The design of a test artifact is generated by a computer flow chart, given in FIG. 7, developed for mimicking the critical geometric features of an article for which the test artifact here is used for the quality assessment of the article. In an embodiment, defects predicted or expected the article could experience during manufacturing may be translated into the design of a test artifact.

Figure 8:
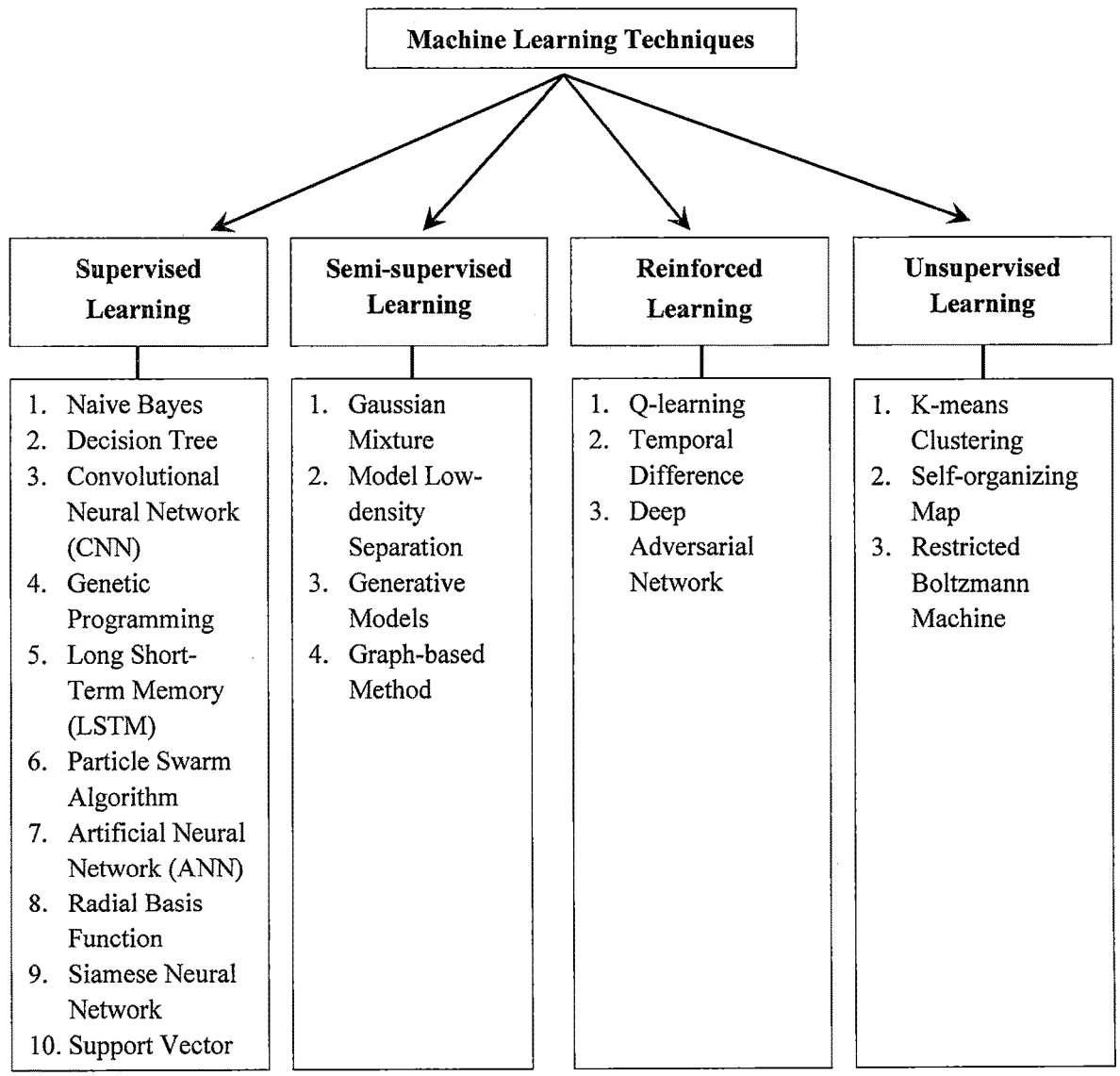

In FIG. 8, classification of ML techniques utilized in the areas of article design for AM, AM process and path optimization, and in-situ monitoring of AM processes and quality control (after Goh et al. (2021)) is presented.

A sensor detects and/or measures a physical property or a physical field variable. A scanning sensor performs the sensing of a sensor task over a line, surface, or space as well as time. In this context, imaging is defined as the action or process of producing an image of a part of an object by various techniques and based on multiple field effects. A scanning field sensor scans a geometric domain for a physical field variable (e.g., temperature, electric field, electromagnetic emission) and captures an image(s) of the area over the geometric domain. Each sensor and device could include a data port and signal connector or both to be interfaced with a monitoring system.

Part quality for metal AM parts is often evaluated on dimensional, volumetric, metallurgical, and surface finish compliance, where each evaluation area makes up a portion of the part quality attributes. Depending upon inspection and quality objectives, various sensing techniques can be adapted to monitor specific aspects of the build quality space. Each technique has its own strengths and deficiencies.

Sensing techniques for local (also referred to as near-field or narrow field-of-view) properties are used to generate real-time process monitoring data, typically measuring process by-products that may indirectly infer a quality condition in a point-wise manner, which refers to a small measurement probe spot size compared to the size of the measurement field. For example, in AM, near-field photodetectors and spectrometers measure light intensity and wavelength content, respectively, from the laser plume and/or the melt zone of an AM process. Various types of spectroscopy (such as near-infrared (NIR), mid-infrared (MIR), Terahertz (far-infrared), Raman) are available. Thermal melt pool imaging captures infrared by-products from the melt pool and heat-affected zone to produce a calibrated image of the melt pool. Both temperature and spatial melt pool metrics can be linked to AM process stability and eventual volumetric defect formation. On the other hand, sensing techniques for global properties (also referred to as areal, far-field, or wide field-of-view) typically acquire data on a layer-by-layer basis, where the data directly infers a quality condition. For example, visible spectrum build area imaging (e.g., machine vision) captures top view images of the build area before a layer is processed and after a layer is processed. Pre-processing images may identify irregularities in the powder spread (such as angled spreading, waviness, and troughs from blade damages) or poor coverage due to part distortion or poor processing on the previous layer. Post-processing images may directly measure geometric compliance and irregular surface conditions. Laser profilometry and three-dimensional structured light microscopy also produce surface topography data. Laser profilometry is a non-contact, non-destructive testing technique used to scan and map the surface of an object with a laser beam. A three-dimensional structured light microscope (a structured-light 3D scanner) is a three-dimensional scanning device for measuring the three-dimensional shape of an object using projected light patterns and a camera system. Data can be acquired pre-process and post-process and utilized to directly measure geometric and surface finish compliance. Thermal imaging (also referred to as infrared thermography (IRT), thermography, thermal video, and thermal imaging infrared camera) is a process where a thermal camera captures and creates an image of an object by using infrared radiation emitted from the surface of the object in a process. A thermal imaging infrared camera captures infrared by-products from the melt pool and heat-affected zone to produce calibrated images of the melt pool. Both temperature and spatial melt pool metrics can be linked to process stability and eventual volumetric defect formation. Thermographic cameras usually detect radiation in the long-infrared range of the electromagnetic spectrum and produce images of that radiation. Thermal build area-imaging captures the top view temperature maps of the build domain throughout processing and post-processing to determine heat flow. This type of measurement, in combination with computational modeling techniques, is used to predict the metallurgical state as a function of three-dimensional position within the build and/or time. Other non-destruction testing (NDT) methods can also be adopted for surface scanning. For example, eddy current arrays could be employed to scan over the metal build to measure both surface topography variation and sub-surface irregularities, cracks, and voids.

A focused X-ray generator is a vacuum tube that converts electrical input power into focused X-rays. The X-ray generator is a device that acts as the primary control mechanism for the entire fluoroscope. It is through the X-ray generator that current is allowed to flow into the X-ray tube. The main function of adjusting the voltage differential and current of the X-ray tube is to control automatically to maintain optimal contrast and brightness. High X-ray flux densities on the samples being investigated are achieved by focusing the divergent beam from the X-ray source onto the sample using one out of a range of focusing optical components.

This source is also useful for scanning probe techniques such as scanning transmission X-ray microscopy and scanning X-ray fluorescence imaging.

Eddy current array is a non-destructive testing technique that provides the ability to electronically drive multiple eddy current coils, which are placed side by side in the same probe assembly. Each individual eddy current coil in the probe produces a signal relative to the phase and amplitude of the structure below it. This data is referenced to an encoded position and time and represented graphically as a C-scan image for irregularity and flaw detection.

The system, method, and device of the present invention, therefore, using a test artifact designed and monitored by the disclosed ways and manners, provide an indicator that can be utilized to identify abnormalities in system operation so that they may be addressed before defects occur in builds, or at least before the entire manufacturing cycle is run. A test artifact can be 2D or 3D. Accordingly, wasting of machine capacity due to manufacturing errors can be minimized. Moreover, a statistical process can capture trends in the manufacturing process so that the system can have predictive quality, leading to preventive maintenance.

In addition to the above, the real-time feedback provided by the present invention may enable additional AM applications where they may currently be cost prohibitive because of low yields.

While the embodiments of the present invention described above refer to printing speed and FDM, the present invention is not so limited in this regard. In particular, it is contemplated that other AM methods and source materials may be utilized to provide real-time feedback and closed-loop control of the manufacturing process.

While the embodiments of the invention described in U.S. patent application Ser. No. 15/731,366 refer to a process parameter in a specific AM technique, the present invention is not so limited in this regard. In particular, it is contemplated that other process parameters, material properties, and their abnormalities extracted from elastic wave and sensor field data in the same or other AM techniques may be utilized to provide real-time feedback and closed-loop control of the manufacturing process.

While the embodiments of the invention described in U.S. patent application Ser. No. 15/731,366 refer to the formation of the pass and stop bands in spectral-domain as a sensing mechanism, the present invention is not so limited in this regard. In particular, in other embodiments, it is contemplated that other features in elastic wave and sensor field data in temporal and spectral domains involved with the same or other AM methods may be utilized to provide real-time feedback and closed-loop control of the manufacturing process.

Artificial Intelligence (AI) refers to the simulation of human intelligence in computers and machines programmed to "think" and generate predictions and actions like humans. In practice, AI typically focuses on more specific traits associated with a human mind, such as learning, predicting, and problem-solving.

Machine Learning (ML) is an application of AI that provides an analysis and modeling system the ability to automatically learn and improve a predictive model for a system under consideration from experience and data without being explicitly programmed. ML focuses on developing and using computer codes that can access data and use it to learn for themselves and develop predictive models. ML takes advantage of the analysis of massive quantities of data and experience for predictive applications.

Signal processing tools provide an ability to analyze, pre-process, and extract features from acquired signals both in time and frequency domains. Typically, such computational tools are employed for filter design and analysis, re-sampling, de-noising, smoothing, de-trending, and power spectrum estimation, as well as time-frequency analysis. In addition to data visualization, these tools provide functionality for extracting features like change-points and envelopes, finding peaks and signal patterns, quantifying signal similarities (e.g., cross-correlation, auto-correlation), and performing measurements such as signal-to-noise ratio (SNR) and distortion.

A database is an organized collection of data and information stored, accessed, updated, and managed electronically from a computer system. The database management system (DBMS) is the software that interacts with end-users, applications, and the database itself to capture, utilize and analyze the data. In addition, the DBMS software incorporates the core facilities provided to administer the database. A database system consists of the data collection, the DBMS, and the associated software applications.

Cloud computing provides on-demand computing services, including processing power, memory, servers, data storage, databases, networking, software, analytics, and intelligence typically over the Internet to offer reliable access with a low maintenance cost, flexible and robust resources, and economies of scale.

In one embodiment, a test artifact is sized according to a wavelength argument. Moreover, while the embodiments of the invention described in U.S. patent application Ser. No. 15/731,366 disclose the use of a test artifact with periodic 3D internal structures that are of a regular grid structure, it is contemplated that other periodic 2D and 3D structures may be utilized for interrogating the test artifact for specific properties linked to desired monitoring objectives. In other embodiments, surface structures and features such as single tracks (or beads) or complex two geometric patterns on the surface of a multi-mode waveguide are also usable as 2D test artifacts. The development of such pre-defined monitoring objectives is often based on artifact geometries, the process parameters, specification of AM machines and source materials used in the print job, the data analysis of previous print jobs, and heuristics of human experts. In particular, in an embodiment, an internal structure may be utilized to provide an effect of the radius of curvatures in the article and the response of the AM machine and processes to such features. In an embodiment, a surface pattern on a waveguide may be utilized to provide an effect of the radius of curvatures in the article and the response of the AM machine and processes to such features. In other embodiments, layer-to-layer fiber offsets and crossing properties may be taken into consideration in the artifact design. In other embodiments, one or more of these factors are automatically considered using a computer program product based on one or more deterministic algorithms. In other embodiments, a computer program product may take advantage of ML algorithms in linking observed characteristics to desired monitoring objectives for developing specific test artifacts. In other embodiments, a computer program product may take advantage of deterministic physics-based algorithms in linking observed characteristics to desired monitoring objectives for developing specific test artifacts. In other embodiments, in designing test artifacts, a computer program product may work with a human operator interacting with one or more computer program products based on one or more deterministic and ML algorithms.

In an embodiment, a method of process control for an AM system is provided. The method includes the steps of monitoring a test artifact created during manufacture, capturing at least one waveform, deriving data from at least one waveform, feeding the waveform data into the statistical process control module of an AM machine, and generating an alert if the waveform data exceeds pre-determined control limits. In an embodiment, the step of monitoring the test artifact occurs in real-time. In an embodiment, the waveform data are obtained for at least one of the available bonding mechanisms, source material types, and process control laws. In an embodiment, the method may also include the step of, in response to the alert, taking corrective action. In an embodiment, the corrective action may consist of pausing operation of the system and calibrating, adjusting, or replacing a component of the system, and resuming operation. In an embodiment, the corrective action includes removing the component from the system and initiating a new cycle. In an embodiment, the steps of monitoring the test artifact and capturing at least one waveform of the test artifact are carried out by a high repetition rate pulser/receive unit.

In an embodiment, the powder material is a metal powder. In an embodiment, the material is glass. In an embodiment, the material is silica. In an embodiment, the glass material is a glass powder. In an embodiment, the silica material is a silica powder. In another embodiment, a material in a wire format is source material to an AM machine. In another embodiment, several different materials are utilized in a monitoring event.

In an embodiment, a transducer and a pulser/received unit with a beam formation functionality as well as supporting hardware and software are utilized. Beam formation allows focusing wave energy at a particular zone of the test artifact, allowing scanning of the interior of the test artifact or examining specific zones of interest in a test artifact during manufacture. In an embodiment, the particular zones of interest would be bonding zones and connection points.

In an embodiment, the generating transducer is piezoelectric. In an embodiment, the generating transducer is PMUT. In an embodiment, the generating transducer is CMUT. In an embodiment, the generating transducer is a pulsed laser beam. In an embodiment, the generating transducer is a laser-included plasma shockwave generated by a focused pulsed laser beam. In an embodiment, the generating transducer is an electric arc spark. In an embodiment, the generating transducer is an electric arc-included plasma shockwave. In an embodiment, the generating transducer is an air-coupled acoustic transducer.

In an embodiment, the sensing transducer is piezoelectric. In an embodiment, the sensing transducer is PMUT. In an embodiment, the sensing transducer is CMUT. In an embodiment, the sensing transducer is a Doppler vibrometer. In an embodiment, the sensing transducer is a light interferometer. In an embodiment, the sensing transducer is an air-coupled acoustic transducer.

In an embodiment, the narrow field-of-view sensor is a photodetector. In an embodiment, the narrow field sensor is a spectrometer. In an embodiment, the narrow field-of-view sensor is a thermographic camera. In an embodiment, the narrow field-of-view sensor is an X-ray source.

In an embodiment, the wide field-of-view sensor is a visible spectrum video camera. In an embodiment, the wide field-of-view sensor is a laser profilometry camera. In an embodiment, the wide field-of-view sensor is a light profilometry camera. In an embodiment, the wide field-of-view sensor is a three-dimensional structured light microscope. In an embodiment, the wide field-of-view sensor is a thermographic scanning camera. In an embodiment, the wide field-of-view sensor is a scanning X-ray imager. In an embodiment, the wide field-of-view sensor is a terahertz imaging scanner. In an embodiment, the wide field-of-view sensor is an eddy current array.

It is to be understood that the above description is intended to be illustrative and not restrictive. For example, the above-described embodiments (and/or aspects thereof) may be used in combination with each other. In addition, many modifications may be made to adapt a particular situation or material to the teachings of the invention without departing from its scope.

While the dimensions and types of source materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of the invention, including making and using any devices or systems and performing any incorporated methods. The patentable scope of the invention is defined by the claims and may include other examples that occur to one of ordinary skill in the art. Such other examples are intended to be within the scope of the claims if they have structural elements that do not differ from the literal language of the claims or if they include equivalent structural elements with insubstantial differences from the literal languages of the claims.

As used herein, an element or step recited in the singular and proceeded with the word "a" or "an" should be understood as not excluding plural of said elements or steps unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Those skilled in the art will recognize improvements and modifications to the preferred embodiments of the disclosure. All such improvements and modifications are considered within the scope of the concepts disclosed herein and the claims that follow.

It will be appreciated that many variations of the above systems and methods are possible and that deviation from the above embodiments are possible, but yet within the scope of the claims. Many modifications and other embodiments of the invention set forth herein will come to mind to one skilled in the art to which these inventions pertain, having the benefit of the teachings presented in the foregoing descriptions and the associated drawings. Such modifications may, for example, involve using a different source of melting energy. Other source materials (i.e., feedstock) than metallic powder or wires may be used, such as powder of polymers, powder of ceramics, powder of glass, and powder of silica. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

I claim:

1. A system for generating, receiving, and processing of multi-mode elastic waves and field sensor data in at least one test artifact to assess the quality of an article being built, and its source materials, additive manufacturing machines and processes during a fabrication cycle, comprising:
    a computing device comprising one or more:
        a memory unit;
        a storage medium;
        a library of historical data sets comprising of elastic wave and field sensor data, a set of additive manufacturing machine and process parameters, and post-production quality assessments of the previously built articles and their corresponding test artifacts;
        a computer processor in connection with the memory unit and the storage medium that are readable and writable by the processor;
        a set of software instructions for synchronizing and executing computing and data exchange tasks and governing data flow in the computing device and external devices and sensors;
        at least one data port and interface for external devices and sensors;
        at least one data port for external communications and networking;
        a central analysis software tool for predictive analysis and the generation of warnings and messages; and
        a graphical user interface software tool that provides an operator with remote real-time access to the computing device for the controls of the system;
    at least one test artifact;
    at least one multi-mode elastic wave generating transducer;
    at least one multi-mode elastic wave receiving transducer;
    at least one wave delay line causing time delays in traveling elastic waves;
    at least one scanning field sensor;
    at least one near-field sensor;
    at least one tracker that moves a field sensor along a predefined path on a test artifact;
    a multi-channel pulser/receiver unit generating and receiving transient electrical signals;
    an analog-to-digital signal converter unit;
    a communication utility for networking and coordinating one or more systems, additive manufacturing machines, and computing devices; and
    at least one physical or data port for mounting and interfacing the system to an additive manufacturing machine.

2. The system according to claim 1, wherein the test artifact in an additive manufacturing machine further comprises one or more of:
    a free-standing test artifact structure;
    a test artifact structure as an integral part of the article;
    an adopter for coupling one or more devices in the system to the test artifact; and
    a physical framework housing the elements of a test artifact and mounting it to an additive manufacturing machine.

3. The system of claim 1, wherein the elastic wave-generating device further comprises one or more of:
    a data port;
    a signal connector;
    a single-element transducer comprising one or more:
        at least one active element;
        at least one protective and impedance matching layer;
        at least one backing layer; and
        at least one impedance matching circuit;
    a multi-element transducer comprising one or more:
        at least one active element array;
        at least one protective and impedance matching layer;
        at least one backing layer;
        at least one impedance matching circuit; and
        at least one phased-array electronics unit;
    a micro-machined ultrasonic transducer comprising one or more:
        at least one active element;
        at least one protective and impedance matching layer;
        at least one backing layer; and
        at least one impedance matching circuit;
    a multi-element micro-machined ultrasonic transducer comprising one or more:
        at least one active element;
        at least one protective and impedance matching layer;
        at least one backing layer;
        at least one impedance matching circuit; and
        at least one phased-array electronics unit;
    an air-coupled acoustic transducer comprising one or more:
        at least one active element;
        at least one protective and impedance matching layer;
        at least one backing layer;
    at least one impedance matching circuit; and
        a timing mechanism for generating focused elastic and guided elastic waves;
    a pulsed-laser capable of generating a series of repeatable laser pulses with a duration in the range of 1 picosecond and 100 microseconds and pulse energy in the range of 10 milliJoule to 10 Joules;
    an electromagnetic acoustic transducer capable of generating a series of repeatable electrical pulses with a duration in the range of 1 nanosecond and 100 microseconds and pulse energy in the range of 10 milliJoule to 10 Joule; and
    an electrical arc generator capable of generating a series of repeatable arc pulses with a duration in the range of 1 nanosecond and 100 microseconds and arc voltage in the range of 1 Volt to 10000 Volts.

4. The system of claim 1, the elastic wave-receiving device, further comprises one or more of:

a data port;
a signal connector;
a single-element transducer comprising one or more:
  at least one active element;
  at least one protective and impedance matching layer;
  at least one backing layer; and
  at least one impedance matching circuit;
a multi-element transducer comprising one or more:
  at least one active element array;
  at least one protective and impedance matching layer;
  at least one backing layer;
  at least one impedance matching circuit; and
  at least one phased-array electronics unit;
a micro-machined ultrasonic transducer comprising one or more:
  at least one active element;
  at least one protective and impedance matching layer;
  at least one backing layer; and
  at least one impedance matching circuit;
a multi-element micro-machined ultrasonic transducer comprising one or more:
  at least one active element;
  at least one protective and impedance matching layer;
  at least one backing layer;
  at least one impedance matching circuit; and
  at least one phased-array electronics unit;
an air-coupled acoustic transducer comprising one or more:
  at least one active element;
  at least one protective and impedance matching layer;
  at least one backing layer;
  at least one impedance matching circuit; and
  a timing mechanism for generating focused elastic and guided elastic waves;
an acoustic emission sensor comprising one or more:
  at least one active element;
  at least one protective and impedance matching layer;
  at least one backing layer; and
  at least one impedance matching circuit;
a displacement measuring light interferometer with a surface scanner capable of acquiring a set of transient surface displacement waveforms with an amplitude in the range of 1 picometer to 1 millimeter and a frequency in the range of 1 kHz-500 MHz; and
a laser vibrometer with a surface scanner capable of acquiring a set of transient surface displacement waveforms with an amplitude in the range of 1 picometer to 1 millimeter and a frequency in the range of 1 kiloHertz-500 MegaHertz.

5. The system of claim 1, the field sensor further comprises one or more of:
a wide field-of-view scanning sensor; and
a narrow field-of-view sensor.

6. The system of claim 1, wherein the narrow field-of-view sensor further comprises one or more of:
a data port;
a signal connector;
a photodetector with a wavelength in the range of from 0.5 to 25 micrometers;
a spectrometer with a wavelength in the range of from 0.5 to 25 micrometers;
a thermographic camera with a wavelength in the range of from 1 to 14 micrometers; and
an X-ray source with a wavelength in the range of from 10 picometers to 10 nanometers and with an energy level in the range of from 5 to 500 keV.

7. The system of claim 1, wherein the wide field-of-view scanning sensor further comprises one or more of:
a data port;
a signal connector;
a high-resolution visible spectrum video camera with a wavelength in the range of from 400 to 700 nanometers;
a laser profilometry with a displacement measurement range of 0-5 millimeters and a resolution less than 0.1 micrometers;
a light profilometry with a displacement measurement range of 0-5 millimeters and a resolution less than 0.1 micrometers;
a three-dimensional structured light microscope with a displacement measurement range of 0-5 millimeters and a resolution less than 0.1 micrometers;
a thermographic scanning camera with a wavelength in the range of from 1 to 14 micrometers;
a scanning X-ray imager with a wavelength in the range of from 10 picometers to 10 nanometers;
a Terahertz imaging scanner in the frequency range from 0.1 to 4 terahertz; and
an Eddy current array with the operating frequency ranges from 20 Hertz to 20 MegaHertz.

8. The system according to claim 1, wherein the central analysis software tool for comparing, analysis and representation of the data from elastic wave and field sensors further comprises one or more of:
a signal processing software utility;
a machine learning software utility;
an artificial intelligence software utility;
a statistical analysis software utility; and
a computer networking utility.

9. The system according to claim 1, wherein the computing device:
operates the central analysis software tool;
executes the monitoring tasks in real-time in-situ;
takes one or more of the following corrective actions in response to real-time alerting signals;
adjusts the process parameters of the additive manufacturing machine in real-time, acquiring additional multi-mode elastic waves and field sensor data from at least one test artifact;
interrogating at least one test artifact; and
replacing at least one component of the additive manufacturing machine, changing source materials, and initiating a new manufacturing cycle.

10. The system according to claim 1, wherein the computing device:
examines at least one test artifact after production for; and
determines, based on acquired multi-mode elastic waves and field sensor data, one or more of the following: the operational process parameters of the additive manufacturing machine, the level of deviations of the technical product specifications of an article made by the additive manufacturing machine under identical processing conditions, the levels of deviations of the technical specifications of the source materials utilized, and the type and severity levels of defects and print errors in the test artifact.

11. The system according to claim 1, wherein the computing device:
designs one or more test artifacts in accordance with a set of user-defined testing and monitoring objectives based on the technical product specifications of an article for manufacturing, its geometric representation for the additive manufacturing machine, its source material or materials, its additive manufacturing process parameters, its post-processing requirements, and its acceptable levels of engineering tolerances for all these parameters, requirements and attributes; and modifies and enhances the design of a test article for building the test artifact as an integral part of the article for manufacturing.

12. The system of claim 1, wherein the computing device:
stores a set of pre-determined control limits specified by an operator;
compares the properties of acquired data from elastic wave and field sensors to a set of pre-determined control limits;
stores and access the historical elastic wave and field sensor data in the storage medium of the computing device;
stores and access the post-quality assessment data from previous runs in the storage medium of the computing device;
utilizes the historical data in the machine learning and artificial intelligence algorithms for predicting the state of the additive manufacturing machine and its source materials and processes;
provides data and information to the control system of the additive manufacturing machine in real-time; and
generates real-time control actions, warnings, and messages according to a set of rules included in the computing device.

13. The system of claim 1, wherein the computing device may be in real-time communications with one or more of the following:
a local computing facility with a communication utility for networking, a networked remote computing facility, at least one networked additional additive manufacturing machine, and a networked cloud-based computing facility with the identical functionality and utility of the computing device.

14. The system according to claim 1, wherein the tracker system in an additive manufacturing machine further comprises one or more of:
at least one motorized motion platform housing one or more field sensors;
at least one motor driving the motion of one or more platforms;
at least one motion controller driving the motion of one or more platforms;
at least one drive circuit governed by the computing device of the monitoring system;
at least one control circuit connected to the computing device of the monitoring system and the motion controller;
at least one system that verify the position of the sensing area;
at least one software package integrated with the computing device of the monitoring system to govern tracking functions;
a data port;
a signal connector; and
at least of one feedback sensor.

* * * * *